United States Patent [19]

Gugger et al.

[11] Patent Number: 4,769,310

[45] Date of Patent: Sep. 6, 1988

[54] LASER MARKING OF CERAMIC MATERIALS, GLAZES, GLASS CERAMICS AND GLASSES

[75] Inventors: Heinrich Gugger, Muntelier; Fritz Herren, Düdingen; Manfred Hofmann, Marly; André Pugin, Pont-la-Ville, all of Switzerland

[73] Assignee: Ciba-Geigy Corporation, Ardsley, N.Y.

[21] Appl. No.: 8,818

[22] Filed: Jan. 30, 1987

[30] Foreign Application Priority Data

Jan. 31, 1986 [CH] Switzerland ............... 363/86

[51] Int. Cl.$^4$ ............... G03C 5/16; G03C 5/00; G03C 1/72; G03C 1/64
[52] U.S. Cl. ............... 430/346; 430/495; 430/540; 430/945; 430/964; 65/30.11; 501/13
[58] Field of Search ............ 430/346, 495, 945, 964, 430/540; 65/30.11; 501/13

[56] References Cited

U.S. PATENT DOCUMENTS

| | | | |
|---|---|---|---|
| 2,515,275 | 7/1950 | Stookey | 430/495 |
| 3,359,125 | 12/1967 | Bishop | 106/84 |
| 4,125,405 | 11/1978 | Aranjo et al. | 106/84 |
| 4,160,654 | 7/1979 | Bartholomew et al. | 65/30.11 |
| 4,297,417 | 10/1981 | Wu | 430/495 |

FOREIGN PATENT DOCUMENTS

| | | |
|---|---|---|
| 3108404 | 11/1982 | Fed. Rep. of Germany . |
| 3130214 | 2/1983 | Fed. Rep. of Germany . |
| 3539047 | 7/1986 | Fed. Rep. of Germany . |
| 2169282 | 7/1986 | United Kingdom . |

OTHER PUBLICATIONS

Ullmans Enzyklopaedie der Tech. Chemie, 4th ed., vol. 13, pp. 712-716.
Ullmans Enzyklopaedie, 4th ed., vol. 13, pp. 722-724.
Ullmans Enzyklopaedie, 4th ed., vol. 12, pp. 317-366.
Ullmans Enzyklopaedie, 4th ed., vol. 14, pp. 1-12.
Chem. Abst. 103, 26188n (1985).

*Primary Examiner*—Richard L. Schilling
*Attorney, Agent, or Firm*—Luther A. R. Hall

[57] ABSTRACT

A method of laser marking ceramic materials, glazes, glass ceramics and glasses that contain at least one radiation-sensitive additive, utilizing a laser beam as radiation energy source which is either applied to, or focused on, the surface of the material to be marked in accordance with the form of the graphic symbols to be reproduced, such that a change in color is induced at the irradiated areas, wherein the wavelength of said laser beam used as energy source is in the near UV and/or visible range and/or infra-red range, and the radiation-sensitive additive is an inorganic pigment.

7 Claims, No Drawings

LASER MARKING OF CERAMIC MATERIALS, GLAZES, GLASS CERAMICS AND GLASSES

The present invention relates to a process for laser marking ceramic materials, glazes, glass ceramics and glasses, and to the marked material so obtained.

The marking of ceramic materials, glazes and glasses is effected by conventional marking methods such as etching, cutting, engraving, grinding or by applying a glass or glaze colour. In these methods, the surface of the marked material is altered, with the consequence that the material may suffer damage, especially if marking is effected by etching, engraving or cutting. The application of a glass or glaze colour necessitates in addition a second firing step. The markings so produced are not always satisfactory in all respects.

It is also known to mark glass by means of a laser beam, whereas the known methods are based on melting or removing matrix material such that the surface of the marked material is also altered. Thus, for example, the proposal is made in DD patent specification No. 215776 to produce coloured images on glass by irradiation with a laser beam. This method comprises irradiating the glass, which is provided with a coating containing colorant, such that the colorant diffuses into the glass softened by the laser beam.

There has now been found a direct and simple method which makes it possible to mark ceramic materials, especially already baked ceramic materials, glazes, glass ceramics and glasses, without damaging the surface.

Accordingly, the present invention relates to a method of laser marking ceramic materials, glazes, glass ceramics and glasses that contain at least one radiation-sensitive additive, utilising a laser beam as radiation energy source which is either applied to, or focused on, the surface of the material to be marked in accordance with the form of the graphic symbols to be reproduced, such that a change in colour is induced at the irradiated areas, wherein the wavelength of said laser beam used as energy source is in the near UV and/or visible range and/or infra-red range, and the radiation-sensitive additive is an inorganic pigment.

The method of this invention is especially suitable for marking ceramic materials and glazes.

By ceramic materials are meant inorganic, non-metallic, high-melting materials that are usually referred to in the literature as clay ceramics and special ceramics. Examples thereof are oxides in crystalline or glassy form, e.g. alkali metal or alkaline earth metal aluminosilicates or aluminoborates, as well as non-oxides such as carbides, nitrides and silicides. For further examples, attention is drawn to Ullmanns Enzyklopädie der techn. Chemie, 4th Edition, Vol. 13, pp. 712–716.

Glazes are glassy coatings applied to a ceramic material and having a composition very similar to that of glass (op. cit., pp. 722–724). Typical examples of glazes are those consisting of quartz, clay, alkali metal oxides, alkaline earth metal oxides, and low melting oxides (such as $NO_2$, $K_2O$, $CaO$ and $BaO$) as fluxes.

Glasses and glass ceramics are also well known in the art and are described in Ullmanns Enzyklopädie, 4th Edition, Vol. 12, pp. 317–366).

Suitable radiation-sensitive additives are inorganic pigments that preferably absorb in the near UV and/or visible range or in the near infra-red range.

By "near UV range" is meant the range from 0.25 $\mu$m to 0.38 $\mu$m. Additives that absorb in the visible range are especially suitable.

Examples of suitable inorganic pigments are described in Ullmanns Enzyklopädie der techn. Chemie, 4th Edition, Vol. 14, pp. 1–12, and in the publication of the Dry Color Manufacturers' Association (DCMA) "Classification and Description of the Mixed Metal Oxide Inorganic Colored Pigments", Second Edition, January 1982. These pigments are "ceramic colorants", for example compounds of oxides of different transition elements or compounds of oxides of transition elements and of metal oxides of elements of the main groups of the Periodic System, e.g. having the spinel type structure, and also compounds such as zirconium silicate, zirconium oxide or tin oxide, the crystal lattice of which contains ions of transition metals or rare earth metals, as e.g. in zirconium vanadium blue, in zirconium preseodyme yellow and in zirconium iron pink, or the cadmium sulfides and cadmium sulfoselenides, as well as inclusion pigments containing such compounds, e.g. based on zirconium silicate, tin oxide, zirconium oxide or quartz.

Example of typical ceramic colorants are cobalt aluminates, chrome tin pink sphene, chrome tin orchid cassiterite, tin vanadium yellow, zirconium vanadium yellow, zirconium vanadium blue, zirconium preseodyme yellow, zirconium iron pink, the cadmium sulfoselenides and cadmium sulfides and the inclusion compounds containing them, e.g. zirconium silicate, tin oxide, zirconium oxide or quartz; copper-red, manganese pink, colcothar, the iron oxide brown pigments such as iron oxides, iron-chrome-alumina spinels, manganese-alumina spinels, zinc-chrome spinels, iron-alumina spinels, zinc-iron spinels, nickel-iron spinels, manganese-chrome spinels, zinc-iron-chrome spinels, tin oxide, titanium dioxide and titanates, e.g. nickel-antimony titanate, chrome-antimony titanate or manganese-antimony titanate.

Preferred pigments of this invention are zirconium vanadium yellow, preseodyme yellow, the iron oxide brown pigments such as zinc-iron-chrome spinels and zirconium iron pink, titanium dioxide, titanates, cadmium sulfides and cadmium sulfoselenides as well as inclusion pigments containing such compounds. Zirconium iron pink is especially preferred.

The material of this invention may contain the radiation-sensitive additive e.g. in an amount of 0.01 to 30% by weight, preferably 0.1 to 20% by weight, most preferably 1 to 10% by weight.

Depending on the utility, further additives that are known to one skilled in the art may be added to the materials to be marked, e.g. glass fluxes, coloured or colourless lustres and thinning agents.

Energy-rich sources such as lasers are conveniently used to mark the inorganic materials suitable for use in the practice of this invention. The procedure comprises either applying the energy source to the surface of the material to be marked in accordance with to the form of the graphic symbols to be applied or focusing it thereon, such that a change in colour is induced at the irradiated areas without causing any perceptible damage to the surface of the marked material. Suitable lasers are e.g. those that radiate energy at a wavelength in the near UV range, in the visible range and/or infra-red range.

Examples of such energy sources are solid state pulsed lasers such as ruby lasers or frequency multiplied Nd:YAG lasers, pulsed lasers with booster such as pulsed dye lasers or Raman shifter, and also continuous wave lasers with pulse modifications (Q-switch, mode locker), for example on the basis of CW Nd:YAG lasers with frequency multiplier or CW ion lasers (Ar, Kr), as well as pulsed metal vapour lasers, for example copper vapour lasers or gold vapour lasers, or high capacity pulsed semi-conductor lasers, and also pulsed gas lasers such as excimers.

Depending on the laser system employed, pulse contents of up to several Joules, intensities of up to $10^{12}$ W/cm$^2$, pulse durations of up to $10^{-15}$ seconds and frequencies of up to $10^9$ Hz are possible. Pulse contents of micro-Joule to Joule, intensities of kilowatt/cm$^2$ to 100 megawatt/cm$^2$, pulse durations of microseconds to picoseconds, and frequencies of hertz to 250 megahertz are advantageously used.

It is preferred to use lasers with pulsed light, for example those listed in the following table. Especially preferred lasers are pulsed or pulse-modified, frequency doubled Nd:YAG lasers or metal vapour lasers such as Au- or, in particular, Cu-vapour lasers. Also particularly preferred is a laser beam having a wavelength in the visible and/or near infra-red range. By near infra-red range is meant the range from 0.78 $\mu$m to 2 $\mu$m.

The following table lists a number of commercially available lasers which may be suitably used in the practice of this invention.

TABLE

| Type/Representative | Examples of commercially available types | Principal wavelength (subsidiary wavelengths) [nm] |
|---|---|---|
| Solid state pulsed lasers | | |
| ruby laser | Lasermetrics (938R6R4L-4) | 694 (347) |
| Nd:YAG laser | Quanta Ray (DCR 2A) | 1064, (532, 355,266) |
| Alexandrite laser | Apollo (7562) | 730–780 |
| Pulsed lasers with booster such as | | |
| Raman shifter | Quanta Ray (RS-1) | UV-IR |
| dye laser | Lambda Physik FL 2002 | c. 300–1000 |
| CW laser with pulse modification | | |
| Nd:YAG (Q-Switch, 2ω) | Lasermetrics (9560QTG) | 532 |
| argon (mode-locked) | Spectra-Physics | 514.5 |
| pulsed metal vapour laser | | |
| Cu vapour laser | Plasma-Kinetics 751 | 510, 578 |
| Au vapour laser | Plasma-Kinetics | 628 |
| Mn vapour laser | Oxford | 534, 1290 |
| Pb vapour laser | Laser CU 25 | 723 |
| Semi-conductor diode lasers | M/A COM Type LD 65 | c. 905 |
| Semi-conductor diode lasers Array | STANTEL Type LF 100 | c. 905 |
| Pulsed gas lasers (excimer) | | |
| XeCl | Lambda Physik | 308 |
| XeF | EMG-103 | 351 |
| N$_2$ | | 337 |
| CO$_2$ | LSI laser Science inc., PRF 150 G | 9000–11000 |

In the practice of this invention, the laser employed will be for example a pulsed, frequency doubled Nd:YAG laser with a pulse content from 0.01 to 1 Joule/cm$^2$, a maximum capacity of about 40 megawatts, pulse durations of 6–8 nanoseconds and a frequency of 20 Hz (Quanta Ray DCR-2A, available from Spectra Physics, Mountain View, Calif.).

If a copper vapour laser (Plasma Kinetics 151) is used, exposure will be carried out with a pulse content of e.g. 250 milli-Joules/cm$^2$, a maximum capacity of about 10 kW, a pulse duration of 30 nanoseconds and a frequency of 6 kHz.

Lasers whose parameters can be readily adjusted, for example pulse content and pulse duration, permit the best possible adaptation to the requirements of the materials to be marked.

The best wavelength to be selected for radiation is that at which the additive effecting a change in colour absorbs light most strongly and the inorganic material least strongly.

Three different methods are suitable for laser marking in the practice of this invention: the mask method, the linear marking method and the point matrix method. In these last two mentioned methods (dynamic focusing), the laser is preferably combined with a laser marking system so that the inorganic material can be marked with any, e.g. computer-programmed, digits, letters and special symbols at the point where the laser beam strikes.

The choice of laser system in respect of capacity and frequency depends basically on the marking method employed. The high capacity and low frequency of the solid state pulsed lasers are preferred for mask exposure. The average to low capacities and rapid frequencies of pulsed metal vapour lasers or of continuous wave lasers with pulse modifications are preferred for producing markings that require dynamic focusing. Beam deflection can be effected e.g. acousto-optically, holographically, with galvo-mirrors or polygon scanners. Dynamic focusing makes possible an extremely flexible marking, as the marks can be produced electronically.

A very wide range of markings can be produced by the present invention. Examples are: variable text programming of numerical symbols by inputting text with a video display unit, test programs of standard symbols or special symbols such as monograms, initials and inscriptions, logos, or frequently recurring data, continuous piece numbering, input of measurable variables, input of a stored program, linear marking or also decorations.

The method of this invention can be used for marking a very wide range of industrial products and articles such as ceramic work pieces and supports, glasses, glass ceramics and glazes.

Typical examples of utilities are the marking of ceramic supports and casings of solid-state circuits, ceramic printed circuit boards (thick-layer, thin-layer and multi-layer PCBs), electronic components such as ceramic parts used in engine construction, and also work pieces for metal cutting. The method of this invention is especially advantageous for frequently changing marking substrates, e.g. for marking customer-specific electronic components, for small run productions or for applying continuous serial numbers.

The method of the present invention makes it possible to produce a direct and rapid marking that is indelible and which is therefore abrasion- and scratch proof. The markings obtained are also corrosion-proof, solventresistant, dimensionally stable, free from deformation, fast to light, heat and weathering, easily legible, and have contrast and good edge definition. In addition, there is virtually no impairment of the mechanical, physical and chemical properties of the marked material, e.g. mechanical strength and chemical resistance.

The impression depth of the marking depends on the marked material and is about 1 mm, with minimum damage to the suitable material. Hence it is possible to obtained markings that give rise to no loss of surface gloss that is perceptible to the eye.

In the method of this invention, a change of colour of marked contrast occurs at the irradiated area of the material upon exposure to a laser beam. Usually the change in colour will be towards grey or black; but it is possible to effect other colour changes, e.g. red or yellow to brown or grey, from red or yellow to white, or from black to white or from brown to grey, depending on the additive employed that effects the change in colour.

The surprising feature of the method of this invention is that inorganic pigments which withstand very high firing temperatures of up to 1200° C. and are known to have good light-resistance none the less undergo a change in colour or discolouration when exposed to intense radiation.

In the following Examples, parts and percentages are by weight unless otherwise indicated.

EXAMPLES (1a) Preparation of sample glazes 10 g of an inorganic pigment listed in the following Table are mixed for 45 minutes in a ball mill with 90 g of a conventional commercial glaze of the molar composition K, NaO:0.22/CaO:0.39/ZnO:0.39/$B_2O_3$:0.23-/$SiO_2$:2.18, and 55 ml of water. The resultant glaze is then sprayed onto a ceramic shard (wet layer thickness: c. 0.8 mm) and fired for 30 minutes at c. 1060° C.

The same procedure is followed for preparing an opacified glaze, except that only 5 g of pigment and, in addition, 5 g of commercially available zircon (zirconium silicate) are used.

(1b) Preparation of the glass samples 5 g of an inorganic pigment listed in the following Table are made into a paste with a commercially available frit and a conventional organic vehicle. This paste is then applied by screen printing to a glass plate and fired at c. 600° C.

(1c) Preparation of the ceramic bodies (materials)

3 g of an inorganic pigment listed in the following Table are mixed dry with 97 g of a conventional ceramic powder consisting of 56 g of feldspar, 8 g of $SiO_2$ and 33 g of clay. Then 4 g of water are added and the composition is moulded and finally fired at c. 1250° C.

(1d) Marking

The samples prepared as described above in (1a), (1b), and (1c) are irradiated by the beam of a Nd:YAG pulsed laser (Quanta Ray DCR-2A, available from Spectra Physics, Mountain View, USA) with light pulses of 6–8 ns (nanoseconds) at a wavelength of 0.532 $\mu$m and a pulse content of 250 mJ (milli-Joules).

The markings obtained have good contrast and exhibit the change in colour indicated in the Table.

TABLE

| Ex. | Pigments:* | DCMA number:** | change in colour from | to |
|---|---|---|---|---|
| (1a) Glazes on ceramic shards (size of samples 7.5 × 7.5 cm) | | | | |
| 1 | Zr—Fe pink, C.I. Pigment Red 232 | 14-44-5 | pink | beige |
| 2 | Zr—Fe-pink, C.I. Pigment Red 232 (reduction with ZrSiO$_4$) | 14-44-5 | pink | white |
| 3 | Zr—Pr yellow, C.I. Pigment Yellow 160 | 14-43-4 | yellow | grey |
| 4 | Zr—V yellow, C.I. Pigment Yellow 160 | 1-01-4 | yellow | pale grey |
| 5 | Cr—Fe—Zn brown, C.I. Pigment Brown 33 | 13-37-7 | brown | black brown |
| 6 | Cr—Fe—Zn brown, C.I. Pigment Brown 33 (reduction with ZrSiO$_4$) | 13-37-7 | light brown | grey |
| (1b) Glass colours on glass plates (size of plates 7.5 × 7.5 cm) | | | | |
| 7 | Cd yellow C.I. Pigment Yellow 37 | — | yellow | brown |
| 8 | Cd red, C.I. Pigment Red 108 | — | red | grey |
| 9 | TiO$_2$, C.I. Pigment White 6 | — | white | grey |
| 10 | Cr—Fe—Zn brown, C.I. Pigment Brown 33 | 13-37-7 | brown | black |
| (1c) Ceramic bodies | | | | |
| 11 | Zr—Fe pink, C.I. Pigment Red 232 | 14-44-5 | pink | beige |
| 12 | Ti—Sb—Cr yellow, C.I. Pigment Yellow 24 | 11-17-6 | brown | black |
| 13 | Cr—Fe—Zn brown, C.I. Pigment Brown 33 | 13-37-7 | brown | black |
| 14 | Cr—Fe brown, C.I. Pigment Brown 35 | 13-33-7 | dark brown | beige |
| 15 | Chromium oxide, C.I. Pigment Green 17 | 3-05-3 | green | brown |

*Sold by: Drakenfeld Colors, Ciba-Geigy, Washington, PA
**Number according to DCMA [Classification and Description of the Mixed Metal Oxide Inorganic Colored Pigment, Second Edition, January 1982, Arlington]

We claim:

1. A process for laser marking ceramic materials, glazes, glass ceramics and glasses that contain at least one radiation-sensitive additive effecting a change in color upon radiation in amounts from 0.01 to 30% by weight, based on said material, which process comprises utilizing a laser beam as radiation energy source which is either applied to, or focused on, the surface of the material to be marked in accordance with the form of the graphic symbols to be reproduced, such that a change in color of marked contrast and legible to the eye is induced at the irradiated areas and corresponding to the form of said graphic symbols, and without perceptible damage to the surface of the marked material, wherein the wavelength of said laser beam used as energy source is in the near UV and/or visible range and/or infra-red range, and the radiation-sensitive additive is an inorganic pigment selected from the group consisting of cobalt aluminates, chrome tin pink sphene, chrome tin orchid cassiterite, tin vanadium yellow, zirconium vanadium yellow, zirconium vanadium blue, zirconium preseodyme yellow, zirconium iron pink, the cadmium sulfoselenides and cadmium sulfides and the inclusion compounds containing them, copper-red, manganese pink, colcothar, the iron oxide brown pigments, iron-chrome-alumina spinels, manganese-alumina spinels, zinc-chrome spinels, iron-alumina spinels, zinc-iron spinels, nickel-iron spinels, manganese-chrome spinels, zinc-iron-chrome spinels, tin oxide, titanium dioxide and titanates.

2. A method according to claim 1 for marking ceramic materials and glazes.

3. A process according to claim 1, wherein a laser with pulsed light is used.

4. A process according to claim 1, wherein a laser beam having a wavelength in the visible and/or close infra-red range is used.

5. A process according to claim 1, wherein a pulsed or pulse-modified, frequency doubled Nd:YAG laser or a metal vapour laser is used.

6. A method according to claim 1, wherein the additive is selected from the group consisting of zirconium vanadium yellow, preseodyme yellow, zinc-iron-chrome spinels, zirconium iron pink, titanium dioxide, titanates, cadmium sulfides and cadmium sulfoselenides, or is an inclusion pigment containing such compounds.

7. A method according to claim 6, wherein the additive is zirconium iron pink.

* * * * *